(12) United States Patent
Harris (10) Patent No.: US 7,318,151 B1
(45) Date of Patent: Jan. 8, 2008

(54) METHOD AND SYSTEM FOR FIRMWARE MANAGEMENT

(75) Inventor: Mike Harris, Durham, NC (US)

(73) Assignee: Network Appliance, Inc., Sunnyvale, CA (US)

( * ) Notice: Subject to any disclaimer, the term of this patent is extended or adjusted under 35 U.S.C. 154(b) by 386 days.

(21) Appl. No.: 10/981,024

(22) Filed: Nov. 4, 2004

(51) Int. Cl.
*G06F 15/177* (2006.01)
(52) U.S. Cl. .......................................... 713/2; 713/100
(58) Field of Classification Search ................ 713/2, 713/100
See application file for complete search history.

(56) References Cited

U.S. PATENT DOCUMENTS

| | | | |
|---|---|---|---|
| 5,864,698 A * | 1/1999 | Krau et al. ................... | 713/2 |
| 6,308,265 B1 * | 10/2001 | Miller ........................... | 713/2 |
| 7,000,101 B2 * | 2/2006 | Wu et al. ...................... | 713/1 |
| 7,069,452 B1 * | 6/2006 | Hind et al. .................... | 713/1 |
| 7,143,279 B2 * | 11/2006 | Goud et al. ................... | 713/2 |
| 2005/0132177 A1 * | 6/2005 | Challener et al. ............. | 713/1 |

* cited by examiner

*Primary Examiner*—Thuan Du
(74) *Attorney, Agent, or Firm*—Suiter Swantz pc llo (57) ABSTRACT

The present invention is a method and system for firmware management. A clipped copy of the firmware associated with a device may be built within the boot image of an appliance. Alternatively, mathematical signatures of the firmware associated with a device may be stored in the boot image of an appliance. Advantageously, use of clipped copies of firmware and mathematical signatures of firmware within the boot image may preserve boot image space while maintaining the integrity of the boot procedure of the appliance. Additionally, a method and system of mitigating firmware corruption is provided by flashing a boot block portion of device firmware only when an update is necessary.

19 Claims, 6 Drawing Sheets

METHOD AND SYSTEM FOR FIRMWARE MANAGEMENT

FIELD OF THE INVENTION

The present invention generally relates to the field of firmware management, and more particularly to a method and system for validating and updating firmware.

BACKGROUND OF THE INVENTION

Consumer, computing and networking appliances (collectively appliance) typically include a program of instructions necessary to boot the appliance and test devices associated with the appliance, start an operating system, and support the transfer of data among devices. Devices associated with an appliance may include drivers, adapters and cards which provide a particular function within the appliance. Devices may also include a program of instructions in the form of firmware, for providing a desired function within the appliance. It is contemplated that those with ordinary skill in the art may refer to the program of instructions executed by devices as microcode.

Flash memory cards are widely utilized in the industry for the boot of an appliance. A motherboard of an appliance may boot the basic input/output instructions (BIOS), which then proceeds to the next step of booting off a flash memory card. After BIOS, the flash memory card may be found and may be executed as if it was a real, local disk. The boot image from the flash memory card may contain firmware for devices associated with the appliance to start the operating capability of the appliance, including, validating the device firmware.

A flash memory card may include a fixed amount of storage, including thirty-two megabytes (32 MB), sixty-four megabytes (64 MB) and one hundred twenty-eight megabytes (128 MB) of storage. Typically, a flash memory storage size is chosen by operating system vendors to support several generations of the operating system due to replacement restraints such as cost. Consequently, a single flash memory storage size may be utilized for a period greater than three years, providing a ceiling for boot image space.

Figure 1:
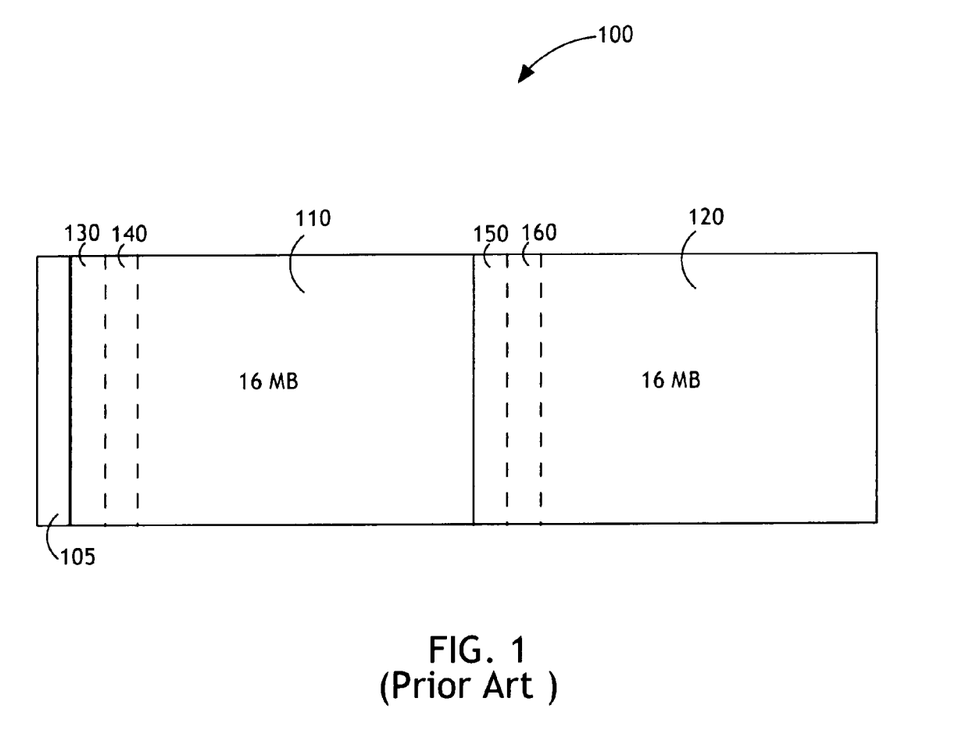
FIG. 1 depicts a block diagram of flash memory.

For instance, referring to FIG. 1, a block diagram of a flash memory 100 known to the art is shown. Typically, the flash memory 100 is divided into a partition table 105 and two or more partitions 110, 120, typically equal-sized. Partition 110 may include a backup image and restore a previous or older version of operating instructions and a second partition 120 may store a primary image, reflecting the latest operating instructions. Alternatively, a partition table 105 may include a bit or value that may signify which partition 110, 120 is active. It may also be commonplace to have four or more partitions.

Each partition 110, 120 has a file system, in this example, a DOS file system (FAT 16 or FAT 32 for example). Each partition 110, 120 has a formatted file system which occupies a portion of each partition. A device typically has a natural block size, which is the minimum unit of allocation at a low level, the file system may cluster one or more blocks creating a cluster of blocks that is the allocation unit for the file system. When files are placed on each partition, blocks 130-160 are typically 512 bytes or larger, and files are rarely a cluster size in length. Consequently, for each file placed in each partition, a portion of the cluster block is wasted. Thus, after formatting and inefficiencies associated with block partitioning, 11 MB to 12 MB may be available for the boot image of a 32 MB flash memory card. It is contemplated that other types of partitioning and file systems may be employed by those with ordinary skill in the art, each of which would still result in a limit for boot image space.

The boot image, stored in a flash memory card, may include startup instructions for the appliance. Typically, the boot image includes firmware for validation and testing of devices associated with the appliance. A firmware image for a particular device may occupy over 750 kilobytes. With several devices, some requiring a firmware image greater than 750 kilobytes, available boot image space is greatly restricted. Consequently, a method and system of managing firmware and firmware updates while preserving the integrity of the device's operations is necessary.

Additionally, when firmware is updated for devices, it is accomplished early in the boot process of the appliance. This may allow initialization of the device, with the new firmware, to continue with a normal startup procedure. Firmware may include a boot block portion and an application block portion. A boot block portion contains instructions necessary for bootstrapping the device with itself and the appliance. The boot block portion is also known as the invariant sector by those with ordinary skill in the art. A boot block portion may occupy a space greater than a single block and may refer to the block of firmware used for booting that may span the hardware "block size if any" for the device. An application block portion is the portion of the firmware instructions which provides the functionality for the device, i.e. causes the device to perform its intended function. In order to maximize the functionality of the device, the application block portion of the firmware is often updated to correct errors in the original or previous versions. Some firmware may include multiple application block portions. A control section may be included in the firmware that may point to each application section. For instance, an application block portion may include a primary section and a backup section.

Vulnerability exists while updating firmware. The update may be interrupted due to a power failure, appliance crash, or system reset. Updating of firmware, also known as flashing to those with ordinary skill in the art, may occupy a large portion of time because it is typically implemented during a boot, and the boot may take much longer than a typical boot where firmware is not being updated. This may cause administrators and information technology professionals to believe an appliance is hung while it is still flashing, thus the administrator or information technology professional may try to reset the appliance prior to completion of the flashing.

If the update is interrupted, the image may be corrupted. If the application block is corrupted, the device will boot strap with the system but will be incapable of providing a normal function of the device as intended by the appliance. The device may be recovered by re-flashing the application block. However, the flashing process requires a device that has initialized with a host system such as an appliance, thus requiring a functional boot block. A boot block that is corrupted by a flashing failure is therefore rendered inoperable, and likely unrecoverable by means available to users. Firmware update failures, particularly boot block update failures, can be a primary cause of failed devices in the field.

As a result, system reliability may be improved by updating the boot block only when absolutely necessary. Some devices contain version information for the application block of the firmware image. Thus, if a later version of the firmware exists, it is difficult to avoid flashing the entire firmware image (application block and boot block) when the version has changed. Since the boot block portion rarely changes, the risk of boot block corruption may be mitigated by updating the boot block only when necessary. Consequently, an improved method and system for updating firmware is necessary.

SUMMARY OF THE INVENTION

Accordingly, the present invention is directed to a method and system for firmware management. In a first aspect of the present invention, a method and system of preserving boot image space is provided. In one embodiment of the invention, a clipped copy of the firmware associated with a particular device may be built into the boot image of an appliance. The clipped copy of the firmware may occupy less space than a full copy of the firmware within the boot image, thus providing additional boot image space for other uses, including firmware associated with other devices. In an alternative embodiment of the invention, mathematical signatures of the firmware may be stored in the boot image of the appliance rather than storing any portion of the firmware. Advantageously, use of mathematical signatures of firmware within the boot image may preserve boot image space while maintaining the integrity of the boot procedure of the operating instructions.

In a second aspect of the present invention, the method and system of the present invention may mitigate firmware corruption. In an embodiment of the invention, the device in which firmware may be updated may check a firmware version indicator, if available, between the firmware representation from the boot image of the appliance and the firmware stored in the flash memory of the device. If the firmware version indicators match, the flash step may be skipped. If a flash is indicated, then the boot block portion of the boot image firmware representation is compared with the boot block portion of the firmware stored in the flash memory of the device until equality or a difference is found. If equality is found, the boot block flash may be skipped and the application block portion may be the only portion which is flashed, if an application block update is necessary. If a difference is found, then the boot block portion of the firmware stored in flash memory of the device may be flashed.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings. Referring generally to FIGS. 2-6, a method and system of firmware management is in accordance with the present invention is shown. For instance, a method and system of representing firmware to occupy less space within a boot image of operating instructions for an appliance is shown. Additionally, a method and system for mitigating firmware corruption is shown, whereby a boot block portion of device firmware is flashed only when an update is necessary.

Figure 2:
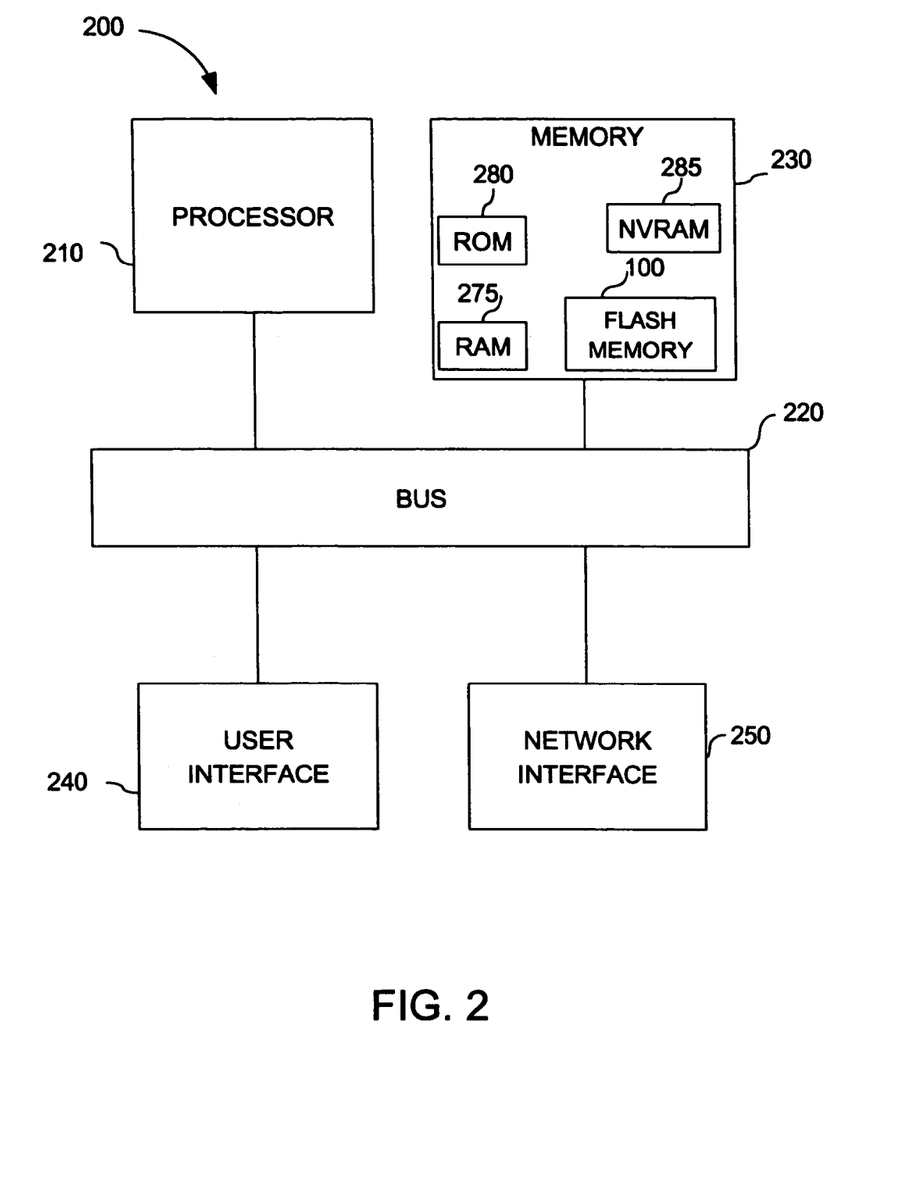
FIG. 2 depicts a block diagram of an appliance in accordance with the present invention.

Referring specifically to FIG. 2, a block diagram of an appliance 200 in accordance with an embodiment of the present invention is shown. Appliance 200 may include a processor 210, bus 220, memory 230, user interface 240, and a network interface 250. It is contemplated that appliance 200 may be implemented as a personal computer, server, and the like without departing from the scope and intent of the present invention.

Processor 210 may include one or more central processing units such as microprocessors or microcontrollers for executing programs stored in memory 230, performing data manipulations and controlling the tasks of the appliance 200. Communication with the processor 210 may be implemented through a message or system bus 220 for transferring information. Bus 220 may include a data channel for facilitating information transfer between storage and other peripheral devices of the appliance 200. Bus 220 may further provide the set of signals required for communication with the processor 210, including a data bus, address bus, and control bus. Bus 220 may comprise any state of the art bus architecture according to promulgated standards, for example industry standard architecture (ISA), extended industry standard architecture (EISA), Micro Channel Architecture (MCA), peripheral device interconnect (PCI) local bus, PCI Express, Infiniband, standards promulgated by the Institute of Electrical and Electronics Engineers (IEEE) including IEEE 422 general-purpose interface bus (GPIB), IEEE 696/S-600, and so on. Furthermore, the system bus 220 may be compliant with any promulgated industry standard. For example, the system bus 220 may be designed in compliance with any of the following bus architectures: Industry Standard Architecture (ISA), Extended Industry Standard Architecture (EISA), Micro Channel Architecture, Peripheral Device Interconnect (PCI), Universal Serial Bus (USB), Access bus, IEEE P6394, Apple Desktop Bus (ADB), Concentration Highway Interface (CHI), Fire Wire, Geo Port, or Small Computer Systems Interface (SCSI), as examples.

Memory 230 may include random access memory (RAM) 275, read only memory (ROM) 280 and flash memory 100. Memory 230 may also include non-volatile random access memory (NVRAM) 285. User interface 240 may include input elements such as a keyboard, mouse and the like whereby an administrator may enter commands that may be executed by processor 210.

A network interface element 250 may provide transfer of data, video and the like between the appliance 200 and remote servers, workstations, storage and the like including network attached storage and storage area networks. The network interface 250 may implement industry promulgated architecture standards, including Recommended Standard 232 (RS-232) promulgated by the Electrical Industries Association, Infrared Data Association (IrDA) standards, Ethernet IEEE 202 standards, Fibre Channel, Fibre Channel over Internet Protocol, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), Universal Serial Bus (USB), and Internet Small Computer System Interface (iSCSI) as examples.

Appliance 200 typically includes devices for providing a desired function within the appliance. These devices typically include device firmware which allows the device to bootstrap the device with itself and the appliance 200 and includes instructions which provides the functionality for the device, i.e. causes the device to perform its intended function. For instance, a bus 220 may include embedded and PCI card based interfaces, such interfaces may represent network, storage and other interfaces. It is contemplated that any type of device, including adapters, embedded adapters, chips, device adapters, host channel adapters, network interface cards and the like that include firmware may be validated and updated in accordance with the present invention.

It is contemplated that appliance 200 may include operating instructions. A boot procedure, implemented as a boot image, may be stored within memory 230 of appliance. Operating instructions may include system software for providing heterogeneous access to data using block-level and file-level protocols from the same software. Storage consolidation, scalability, maximum reliability and maximum availability may be examples of features provided by operating system software run by appliance 200. In an embodiment of the invention, one type of operating system software may be Data ONTAP™ Software written by Network Appliance of Sunnyvale, Calif. By employing Data ONTAP™, the storage system of the present invention may be configured to operate within a UNIX®, Windows® and Web environments.

Figure 3:
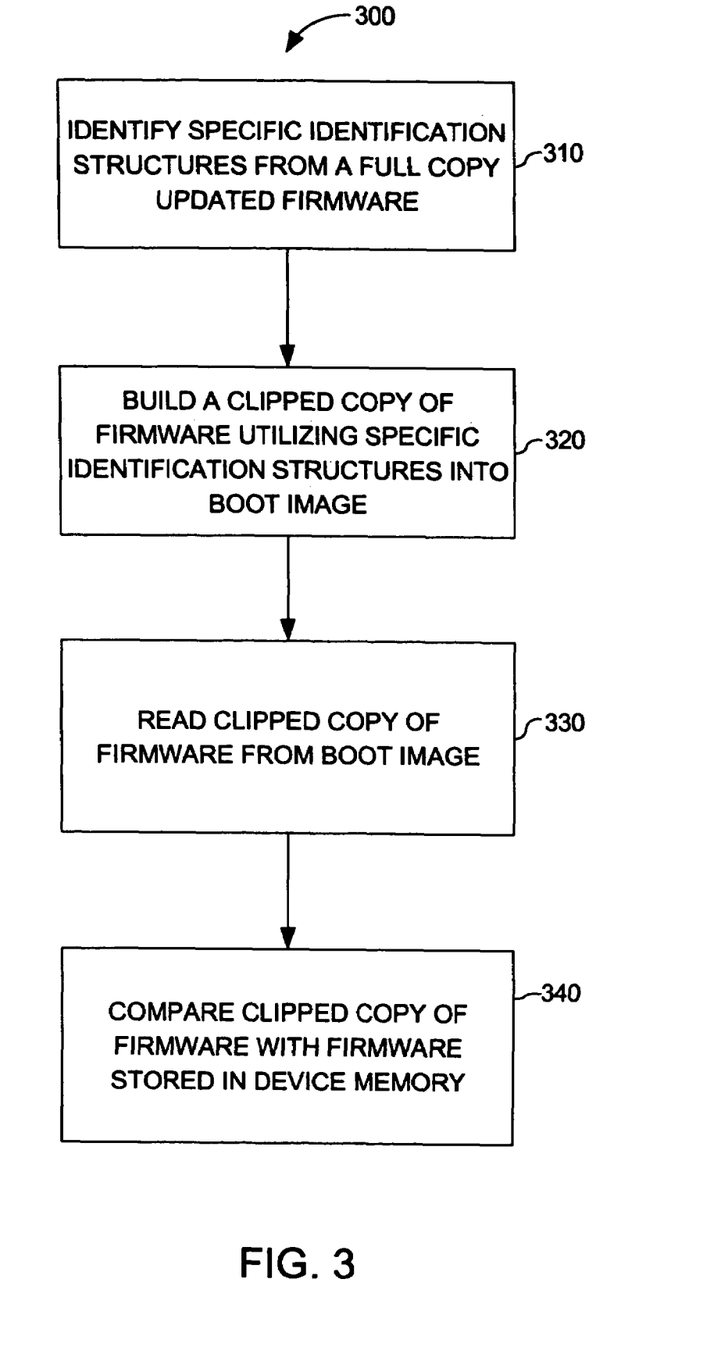
FIG. 3 depicts a flow diagram of a process for validating device firmware employing a clipped copy of firmware within the boot image of the operating instructions for an appliance in accordance with the present invention.

Referring to FIG. 3, a flow diagram of a process 300 for validating device firmware employing a clipped copy of firmware within the boot image of the operating instructions for an appliance 200 in accordance with the present invention is shown. A clipped copy of firmware may refer to a collection of identification structures which identify the device firmware for validation while occupying less boot image space than a full copy of the device firmware. It is contemplated that device firmware, as utilized herein, may refer to firmware stored in memory, such as flash memory, of a device. A device shall refer to any apparatus, adapter, driver, card and the like associated with appliance 200 whereby the device provides a particular function for overall functionality provided by appliance 200.

In an embodiment of the invention, specific identification structures of the firmware may be identified 310. A clipped copy of the firmware, including these specific identification structures, may be built into the boot image 320. These specific identification structures may include specific sectors, byte offset, length, and the like. The specific identification structures may be provided by the vendor of the firmware. During boot of the appliance, the clipped copy or specific structures may be read from the boot image 330. The clipped copy may be utilized to validate the firmware stored in flash memory of the device 340. This validation may include a comparison of the clipped copy or specific structures with the firmware stored in flash memory of the device. If the clipped copy of the firmware matches the firmware in device memory, the device firmware has been validated and an update to the device firmware is not necessary.

In a preferred embodiment of the present invention, the clipped image may be separated into the boot block portion, application block portion and control block portion. Advantageously, the boot block portion of the clipped image may be compared with the boot block portion of the firmware in device memory. If the boot block portion of the device firmware matches the boot block portion of the clipped copy, then an update is not necessary and flashing the boot block portion may be advantageously avoided. Similarly, the application block of the clipped copy may be compared with the application block of the device firmware and the control block of the clipped copy may be compared with the control block of the device firmware. Advantageously, flashing of a portion of the firmware, including boot block, application block and control block, may be limited to particular sections where an inequality has been detected.

Additionally, the clipped copy of the firmware may be employed for further validation. For example, if a post boot (i.e. appliance normal file system is initialized) firmware update is required, then the clipped image may be compared against the on-file-system full (non-clipped) version of the file to validate that it is identical to what this software build requires. If not identical, the device may be left in a degraded state, and a message would be issued to note the discrepancy. The message may be sent to the system, message logs, operator and the like. Advantageously, this provides a high confidence validation that post-boot firmware updates (typically from software installation) are from the identical file that matches this specific build/distribution—yet without requiring a full copy of the firmware file to be placed in the boot image. For instance, a clipped copy of firmware may occupy 122 kilobytes while a full firmware image may be greater than 750 kilobytes. This preserves reliability and integrity while deferring requirements to support larger boot images.

Figure 4:
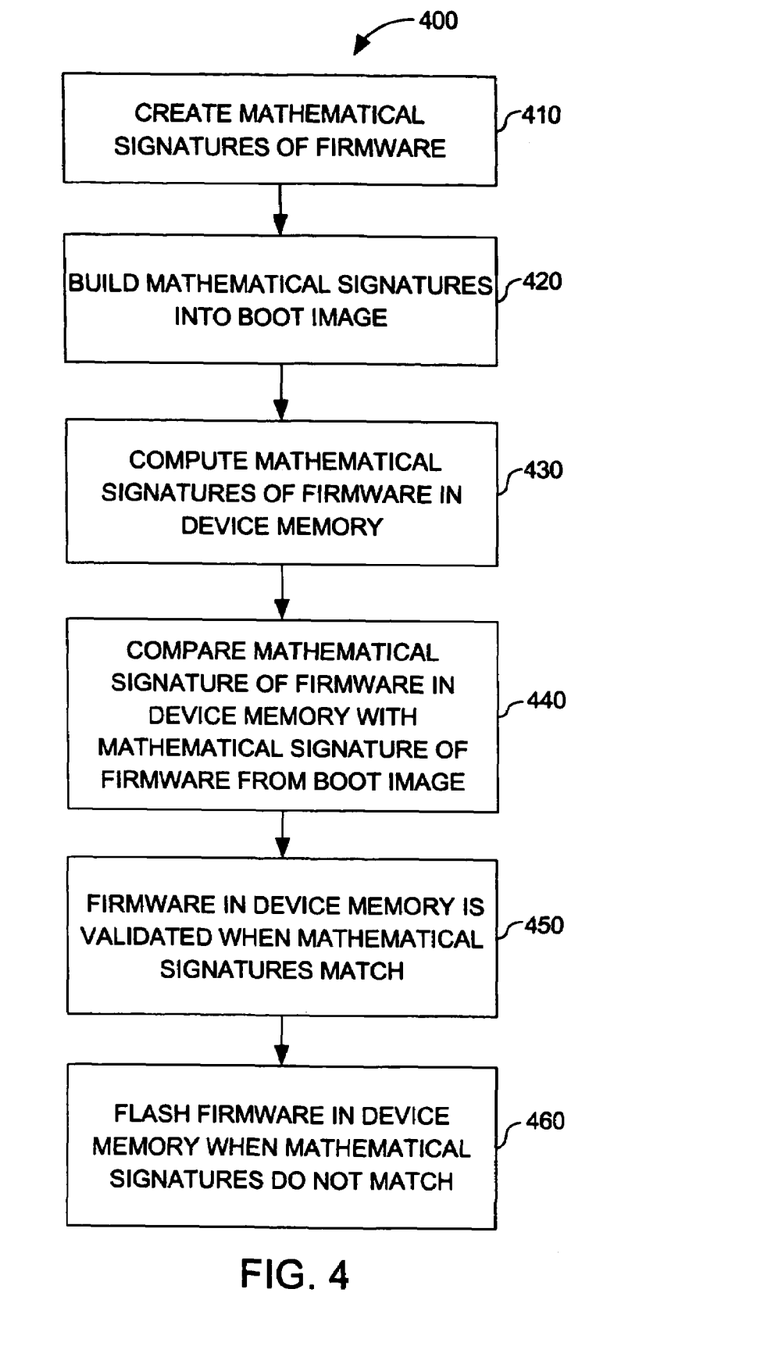
FIG. 4 depicts a flow diagram of a process for validating device firmware employing a mathematical signature of firmware within the boot image of the operating instructions for an appliance in accordance with the present invention.

Referring to FIG. 4, a flow diagram of a process 400 for validating device firmware employing a mathematical signature of firmware within the boot image of the operating instructions for an appliance 200 in accordance with the present invention is shown. Mathematical signatures may refer to cryptographic signatures, cyclical redundancy check (CRC) data and parity information. Process 400 may begin upon creation of mathematical signatures of the firmware. The mathematical signatures may be built into the appliance boot image 420. Firmware for devices is typically flashed at boot before or during device initialization of the appliance boot process. This is advantageous as it may allow the device to run the firmware version specified for the build.

During boot, the mathematical signatures of the device firmware may be computed 430. The computed values may be compared with the values stored in the boot image 440. When the computed values match, the device firmware has been validated and an update to the device firmware is not necessary 450. If the computed values differ from the values stored in the boot image, then the firmware on the device requires flashing to the version used to create the signature 460.

In a preferred embodiment of the present invention, a mathematical signature may be created for the boot block portion, application block portion and control block portion. The mathematical signature associated with each of the boot block, application block and control block may be compared with the computed mathematical signature of the boot block, application block and control block of the device firmware respectively. If the mathematical signature of the boot block portion of the device firmware matches the mathematical signature of the boot block portion of the boot image, then an update is not necessary and flashing the boot block portion may be advantageously avoided. Similarly, a mathematical signature for the application block of the boot image may be compared with the mathematical signature for the application block of the device firmware and the mathematical signature of the control block of the boot image may be compared with the mathematical signature of the control block of the device firmware. Advantageously, flashing of a portion of the firmware, including boot block, application block and control block, may be limited to particular sections where an inequality has been detected, in this instance, where mathematical signatures do not match.

Additionally, the mathematical signatures may provide further validation. If a post boot (i.e. appliance normal file system is initialized) firmware update is required then the on-disk firmware image is read in and the mathematical signature of the entire image (computed dynamically) is used to validate the on-disk firmware image is identical to that used to create the build. Additionally, the mathematical signature of the entire image may be used to validate the file system copy (through a separate companion signature file).

These advantages, while preserving reliability and integrity, may be achieved while providing a substantial reduction in boot image space allocation. For example, a mathematical signature, such as a cryptographic signature, may occupy 33 bytes. When three signatures are utilized, to represent an application block, boot block and control block, for instance, 99 bytes may be occupied. However, an entire firmware image may be greater than 750 kilobytes.

One type of mathematical signature is a cryptographic signature. A message digest (MD) is typical in cryptographic technology for signing an object. An example of a cryptographic signature is a MD5 signature. MD5 creates and verifies message digests (digital signatures) using the MD5 algorithm, developed by Ron Rivest and RSA Data Security, Inc. The MD5 algorithm takes as an input a message of arbitrary length and produces a 122-bit fingerprint or message digest of the inputs. A message digest is a compact digital signature for an arbitrarily long stream of binary data. Advantageously, message digest algorithms may be utilized in verification that data have not been altered since the signature was published.

Figure 5:
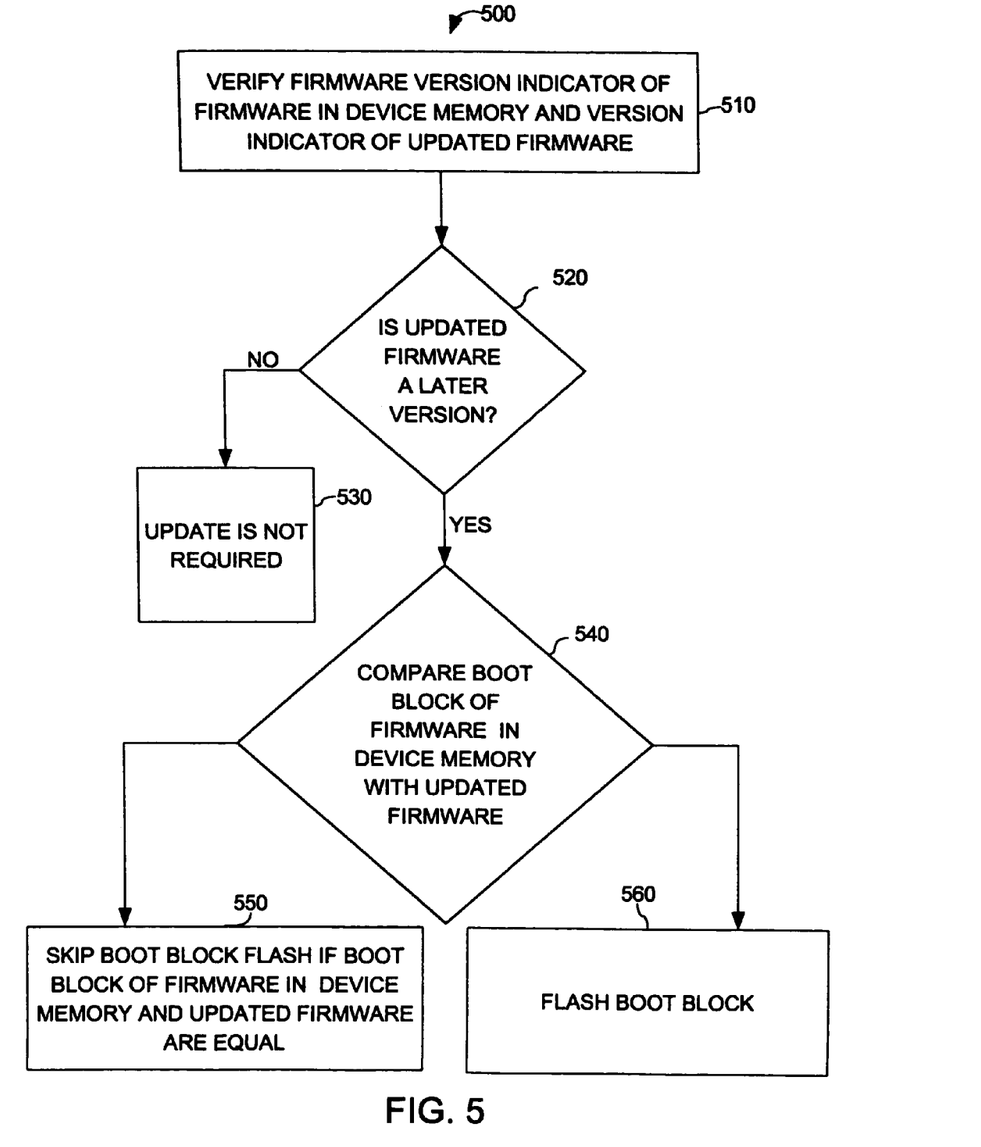
FIG. 5 depicts a flow diagram of a process for validating and updating firmware in accordance with the present invention.

Referring to FIG. 5 a flow diagram of a process 500 for validating and updating firmware in accordance with the present invention is shown. Process 500 may be especially useful when application block and boot block versions are not separated, for example, a version indicator of the application block and a version indicator of the boot block are not provided. If a firmware version indicator is provided, it typically may refer to the version of the application block. Advantageously, process 500 may be implemented in cases regardless of whether a firmware version indicator is available.

Process 500 may begin by verifying a firmware version indicator of the firmware image in a device memory and the version indicator of the firmware representation stored in the boot image of the operating instructions for an appliance 510. Verification may include a determination of whether firmware version indicators are available. A firmware version indicator may refer to vendor specific data (VSD), a cyclical redundancy code (CRC) or a version string. It is contemplated that firmware representation may refer to an entire firmware image, a clipped copy of firmware in accordance with the present invention, or a mathematical signature of firmware in accordance with the present invention.

If the firmware version indicator of the firmware representation is equal, then an update is not required 530. For instance, if the firmware version indicator of the firmware image in device memory is 4.0, for example, and the firmware version indicator of the firmware representation is 4.0, then an update is not required. If the firmware version indicator of the firmware representation is not equal, then a comparison of the boot block portion of the firmware image in device memory with the firmware representation may be executed 540. In an embodiment of the invention, this comparison may be implemented as appropriate. For instance, the comparison may be implemented on a bit level, byte level, block level, sector level and the like, depending upon what may be architecturally convenient.

During the comparison of the boot block of the firmware image in device memory and the firmware representation, if no differences are found, then the boot block flash may be skipped 550, even though the firmware version indicator, if available, indicates a difference. Advantageously, the overall integrity of the device may be maintained in the event of an application block flash interruption. If a difference is found in the firmware image in device memory and the firmware representation, then the boot block portion is flashed 560. Flashing may refer to the erasing of code from memory, and subsequent writing of new firmware in a manner consistent with the flash memory part and its implementation in the device. Advantageously, flashing of the boot block portion may only be as required by actual boot block differences being detected. Boot block failures are primary cause of failed devices. By flashing the boot block only when necessary, risk of firmware corruption is reduced and overall system availability may be improved.

It is contemplated that process 500 for validating and updating firmware in accordance with the present invention may be implemented when a firmware version indicator is not available. In such a situation, process 500 may proceed to step 540 whereby a comparison of the boot block of firmware in device memory with updated firmware is executed. Advantageously, flashing the boot block may be completed only when necessary, even if firmware version indicators are not available.

When a difference is detected in an application block, boot block, or control block, typically the entire block portion is flashed. For instance, if a difference is found in a boot block portion, but equality is found for application block and the control block, then the entire boot block portion is flashed.

Alternatively, in accordance with the present invention, multiple identical devices may be utilized in an appliance. When the appliance is booting, a determination of whether a device was inserted or swapped may not be possible. Thus, each device in the set of identical devices may be tested to determine if a firmware update is necessary. If there is a set of multiple devices which require an identical update, then a difference map of the present invention may be employed. This may be advantageous as it may reduce an amount of time necessary to complete a flash update which facilitates faster booting and higher availability figures in critical deployments.

Figure 6:
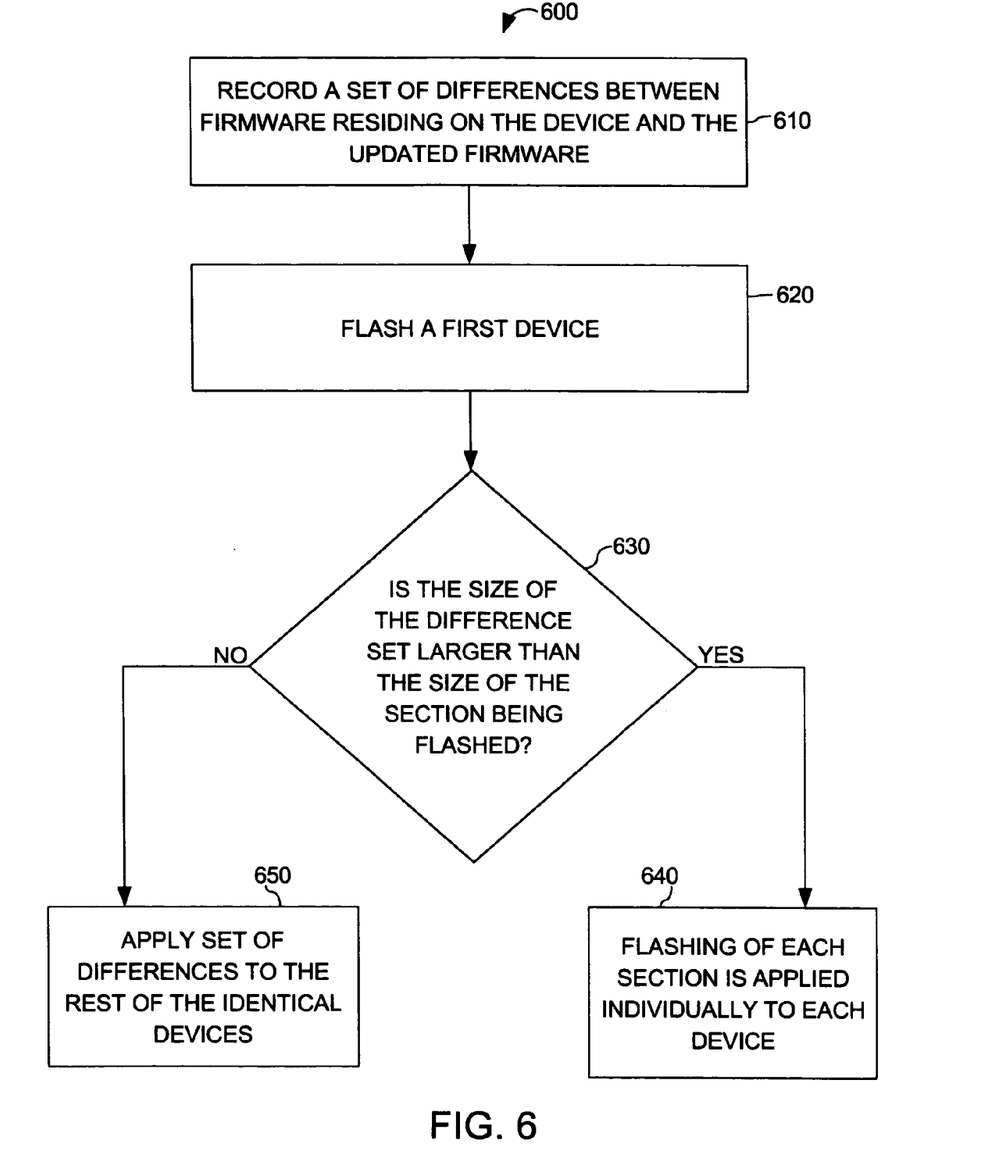
FIG. 6 depicts a flow diagram of a process for validating and updating firmware of multiple identical devices in accordance with the present invention.

Referring to FIG. 6, a process 600 for validating and updating firmware of multiple identical devices in accordance with the present invention begins with recording a set of differences between the firmware residing on the device and the updated firmware 610. A first device may be flashed 620. A determination of the size of the difference set is completed 630. If the difference set approaches or is larger than the size of the section being flashed, then this optimization is discarded and full flashing proceeds for this section of each device 640. If the difference set is smaller than the size of the section being flashed, then for subsequent devices requiring the same update, the set of differences may be applied 650. This is advantageous as it may reduce an amount of time required to support a flash, consequently reducing boot time for an appliance. This provides an optimization method for updating firmware in multiple devices requiring the same set of updates to their firmware.

It is believed that the method and system of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for updating firmware of a device, comprising:
    comparing an application block portion of a firmware in a device memory with an application block portion of a firmware from a boot image;
    comparing a boot block portion of said firmware in said device memory with a boot block portion of said firmware from said boot image;
    flashing said application block portion of said firmware of said device memory when at least one difference is found between said application block portion of said firmware in said device memory and said application block portion of said firmware from said boot image, wherein a boot block flash is avoided when said application block portion is flashed when said boot block portion of said firmware in device memory is equal to said boot block portion of said firmware from said boot image.

2. The method as claimed in claim 1, wherein said comparing of said boot block portion of said firmware in said device memory with said boot block portion of said firmware from said boot image is implemented at a bit level.

3. The method as claimed in claim 1, wherein said comparing of said boot block portion of said firmware in said device memory with said boot block portion of said firmware from said boot image is implemented at a byte level.

4. The method as claimed in claim 1, further comprising flashing said boot block portion of said firmware of said device memory when at least one difference is found between said boot block portion of said firmware in said device memory and said boot block portion of said firmware from said boot image.

5. A method for updating firmware of a device, comprising:
    checking a firmware version indicator of a firmware in a device memory and a firmware version indicator of a firmware from a boot image;
    comparing an application block portion of said firmware in said device memory with an application block portion of said firmware from said boot image;
    comparing a boot block portion of said firmware in said device memory with a boot block portion of said firmware from said boot image;
    flashing said application block portion of said firmware of said device memory when at least one difference is found between said application block portion of said firmware in said device memory and said application block portion of said firmware from said boot image, wherein a boot block flash is avoided when said application block portion is flashed when said boot block portion of said firmware in device memory is equal to said boot block portion of said firmware from said boot image.

6. The method as claimed in claim 5, wherein said firmware version indicator is effected with a cyclical redundancy code.

7. The method as claimed in claim 5, wherein if said firmware version indicator of said firmware in device memory matches said firmware version indicator of said firmware from said boot image, an update of firmware is avoided for said device.

8. The method as claimed in claim 5, wherein said comparing of said boot block portion of said firmware in said device memory with said boot block portion of said firmware from said boot image is implemented at a bit level.

9. The method as claimed in claim 5, wherein said comparing of said boot block portion of said firmware in said device memory with said boot block portion of said firmware from said boot image is implemented at a byte level.

10. The method as claimed in claim 5, further comprising flashing said boot block portion of said firmware of said device memory when at least one difference is found between said boot block portion of said firmware in said device memory and said boot block portion of said firmware from said boot image.

11. A method for validating a firmware of a device associated with an appliance, comprising:
    identifying identification structures of a firmware;
    building a clipped copy of said firmware from said identification structures within a boot image for said appliance, said clipped copy of said firmware including a application block portion, boot block portion and control block portion, said clipped copy occupying less memory space than a full copy of said firmware;
    reading said clipped copy from said boot image;
    validating firmware stored in a device memory from said clipped copy, wherein if said clipped copy matches firmware stored in said device memory, device firmware has been validated and an update to firmware stored in said device memory is avoided.

12. The method as claimed in claim 11, wherein said validating of firmware stored in said device memory includes comparing identification structures with firmware stored in said device memory.

13. The method as claimed in claim 11, wherein validating firmware includes comparing said boot block portion, application block portion and control block portion of said clipped copy with a corresponding boot block portion, application block portion and control block portion of firmware of device memory.

14. The method as claimed in claim 13, further comprising flashing at least one of said corresponding boot block portion, application block portion or control block portion of firmware stored in device memory if at least one difference is found between said boot block portion, application block portion and control block portion of said clipped copy, wherein a portion of firmware of device memory is flashed only if said at least one difference is found.

15. The method as claimed in claim 11, further comprising flashing only said application block portion of said firmware of said device memory when at least one difference is found between said application block portion of said firmware in said device memory and said application block portion of said firmware from said boot image, wherein a boot block flash is avoided when said application block portion is flashed when said boot block portion of said firmware in device memory is equal to said boot block portion of said firmware from said boot image.

16. The method as claimed in claim 11, wherein said identification structures include specific sectors of said firmware.

17. The method as claimed in claim 11, wherein said identification structures include byte offset information.

18. A method for updating firmware for a plurality of identical devices, comprising:

recording a set of differences between firmware stored in a first device with a firmware of a boot image;

flashing said application block portion of said firmware of said first device of a plurality of identical devices when at least one difference is found between an application block portion of said firmware in said device memory and said application block portion of said firmware from said boot image, wherein a boot block flash is avoided when said boot block portion of said firmware in device memory is equal to said boot block portion of said firmware from said boot image;

applying said set of differences to others of said plurality of identical devices when a size of said set of differences is less than a size of a section being flashed.

19. The method as claimed in claim 18, further comprising flashing each device of said plurality of identical devices individually when said size of said set of differences is greater than said size of said section being flashed.

* * * * *